United States Patent [19]

Carson et al.

[11] Patent Number: 5,069,413

[45] Date of Patent: Dec. 3, 1991

[54] CENTRIFUGE MOTOR MOUNT HAVING TWO SLOTTED MEMBERS

[75] Inventors: David M. Carson, Newtown; William A. Romanauskas, Southbury, both of Conn.

[73] Assignee: E. I. du Pont De Nemours and Company, Wilmington, Del.

[21] Appl. No.: 431,224

[22] Filed: Nov. 3, 1989

Related U.S. Application Data

[62] Division of Ser. No. 179,796, Apr. 11, 1988.

[51] Int. Cl.$^5$ .............................................. F16M 13/00

[52] U.S. Cl. ...................................... 248/638; 174/154

[58] Field of Search ............... 248/637, 674, 638, 634, 248/635, 632, 620, 560, 562, 568, 569, 570, 580, 583, 605, 606, 607, 614, 618, , 619; 267/181, 154

[56] References Cited

U.S. PATENT DOCUMENTS

| | | | |
|---|---|---|---|
| 770,385 | 9/1904 | Pott . | |
| 1,805,600 | 5/1931 | Ross | 267/181 |
| 2,138,656 | 11/1938 | Gouldthorpe | 248/605 |
| 2,630,692 | 3/1953 | Naugler . | |
| 2,699,289 | 1/1955 | Allen . | |
| 2,716,356 | 8/1955 | Wiedemann . | |
| 3,042,391 | 7/1962 | Glaser | 267/181 |
| 3,124,342 | 3/1964 | Ormond | 267/154 |
| 3,162,723 | 12/1964 | McCurtain | 248/632 |
| 3,168,474 | 2/1965 | Stallman . | |
| 3,330,520 | 7/1967 | Burroughs . | |
| 3,347,453 | 10/1967 | Georgen . | |
| 3,545,286 | 12/1970 | Stenstrom | 267/154 |
| 3,606,143 | 9/1971 | Stallman . | |
| 3,664,151 | 5/1972 | Pause . | |
| 3,676,723 | 7/1972 | Drucker . | |
| 3,765,631 | 10/1973 | Herbst . | |
| 3,804,324 | 4/1974 | Sinn . | |
| 3,961,745 | 6/1976 | Wright . | |
| 4,010,893 | 3/1977 | Smith . | |
| 4,079,882 | 3/1978 | Mizuyoski . | |
| 4,096,711 | 6/1978 | Carlson . | |
| 4,114,402 | 9/1978 | Craig et al. | 64/15 B |
| 4,143,451 | 3/1979 | Craig et al. | 29/434 |
| 4,203,304 | 5/1980 | Decker . | |
| 4,203,305 | 5/1980 | Williams . | |
| 4,221,325 | 9/1980 | Kubota . | |
| 4,306,514 | 12/1981 | Bouclier . | |
| 4,314,523 | 2/1982 | Boeckel . | |
| 4,332,365 | 6/1982 | Berk . | |
| 4,341,342 | 7/1982 | Hara . | |
| 4,442,004 | 4/1984 | Smith | 267/153 |
| 4,450,391 | 5/1984 | Hara . | |
| 4,511,350 | 4/1985 | Romanauskas . | |

FOREIGN PATENT DOCUMENTS

| | | | |
|---|---|---|---|
| 188617 | 1/1957 | Austria . | |
| 110233 | 6/1984 | European Pat. Off. | 267/181 |
| 183971 | 5/1903 | Fed. Rep. of Germany . | |
| 198574 | 4/1906 | Fed. Rep. of Germany | 82 B/19 |
| 583250 | 5/1929 | Fed. Rep. of Germany . | |
| 1064298 | 8/1959 | Fed. Rep. of Germany . | |
| 1106256 | 5/1961 | Fed. Rep. of Germany . | |
| 3234618 | 3/1984 | Fed. Rep. of Germany | 248/583 |
| 1090004 | 3/1955 | France | 8/3 |
| 2271452 | 12/1975 | France . | |
| 2347570 | 11/1977 | France . | |
| 6408413 | 1/1966 | Netherlands | 267/154 |
| 481870 | 3/1938 | United Kingdom . | |
| 486060 | 5/1938 | United Kingdom . | |
| 1444800 | 11/1962 | United Kingdom | 267/181 |
| 1397172 | 5/1973 | United Kingdom . | |

OTHER PUBLICATIONS

Allied Bendix Aerospace, Bendix Flexural Pivot Publication, Bendix Fluid Power Division, Utica, N.Y.

*Primary Examiner*—Ramon O. Ramirez
*Assistant Examiner*—Robert A. Olson

[57] ABSTRACT

A mounting apparatus in which the vertical, lateral and torsional stiffness of the mounting apparatus are greater than the pivot stiffness. The greater stiffnesses are produced either by loading columns in tension or compression or by bending a rectangular column along its narrow, higher moment of inertia face.

1 Claim, 6 Drawing Sheets

CENTRIFUGE MOTOR MOUNT HAVING TWO SLOTTED MEMBERS

This is a division of application Ser. No. 07/179,796, filed Apr. 11, 1988.

BACKGROUND OF THE INVENTION

1. Field of the Invention

The present invention relates to a mounting apparatus, and in particular, to a mounting apparatus for a motor used in a centrifuge instrument.

2. DESCRIPTION OF THE PRIOR ART

In a centrifuge instrument the rotating member, or rotor, forms part of a system that includes a motor or other source of motive energy a drive shaft, and a rotor mounting device called a spud disposed at the upper end of the shaft on which the rotor is received. It is advantageous for a variety of reasons to cause the rotor to rotate with its center of gravity as close as possible to the axis of rotation. Initially, upon startup of the instrument the mass of the rotor has a tendency to spin on its geometric center. However, as rotor speed increases there occurs a shift in which the mass of the rotor spins about its center of gravity. The speed at which this shift occurs is known as the critical speed of the rotor. Violent motion and vibration are imparted to the rotox and the drive as it reaches the critical speed. However once the critical speed is reached the vibration is significantly decreased. Typically the drive is provided with some form of compliance mechanism which accommodates the forces imposed on the system as the rotor approaches and passes through its critical speed.

Historically centrifuge drives have developed along two distinct paths related to the use of such drives in different centrifuge rotational speed regimes. The drives for so-called lower speed centrifuges (i.e., those having a speed less than twenty thousand revolutions per minute) typically use rigid shafts that are either directly coupled to a drive motor or are belt driven. Any compliance required for the stable operation of the instrument is achieved by the use of elastomeric "shock" mounts. Design of drives for higher speed instruments using such mounts is difficult since the dynamics of the system is influenced by the entire mass supported by the shock mounts, and not merely the rotor mass.

In higher speed centrifuges such as those used in the so-called ultra speed range (i.e., above twenty thousand revolutions per minute) the compliance problem is solved, but at the expense of simplicity, ruggedness and cost, by reducing the dynamic mass and allowing compliance to take place through the flexure of a relatively long and delicate shaft on which the rotor is mounted.

Simple shock mounts cannot be used at higher speeds because of their low lateral and torsional stiffness compared to their pivot or moment stiffness. The moment stiffness is dependent on compression or extension of the elastic shock mount whereas the lateral and torsional stiffness are determined by shear of the elastic mount. For a given mount configuration the shear stiffness is usually only one third of the compressive stiffness. For this reason it is difficult to design critical speed out of the operating range from these three vibration modes.

U.S. Pat. No. 4,511,350 (Romanauskas) relates to a suspension system for a centrifuge. Additionally, there is known a flexural pivot system sold by Bendix Aerospace in which springs are used to accommodate forces.

In view of the foregoing it is believed to be desirable to provide a centrifuge drive that is able to allow significantly higher operating speed with simpler, more rugged, rigid shaft design. It is also believed advantageous to provide a drive having a motor mount that exhibits a relatively high lateral, vertical and torsional stiffness relative to the moment stiffness.

SUMMARY OF THE INVENTION

The present invention relates to a mounting apparatus preferably for a motor used in a centrifuge instrument. The mount has a relatively high vertical, lateral, and torsional stiffness associated therewith as compared to its pivot or moment stiffness. In a first embodiment the mount includes a first and a second mounting member arranged in telescopic relationship with each other. The members are attached to each other at any convenient location, preferably at the ends thereof. Each mounting member is slotted to define a plurality of columns. The axes of some of the columns are parallel to the axis of the mount while the axes of other of the columns extend perpendicularly thereto. The columns are arranged such that a moment force imposed on the first and second members is accommodated by bending of some of the columns while vertical, lateral, and torsional forces are accommodated by compression or tension in at least predetermined ones of the columns. In a preferred instance each member has a pair of parallel and a pair of perpendicular columns. The members are preferably cylindrical and when telescoped a parallel column of one of the members intersects at its midpoint with a perpendicular column on the other member at its midpoint. Each of the columns is offset ninety degrees from the other about the periphery of the member. In a second embodiment the mount includes two members, one of which defines at least one column having an axis parallel to the axis of the mount while the other of the members defines a plurality of columns the axes of which extend perpendicular to the axis of the mount. The columns are arranged such that a moment and a lateral force imposed on the members are accommodated by bending of predetermined ones of the columns while vertical and torsional forces are accommodated by compression or tension in at least predetermined ones of the columns. In the preferred instance the inner member takes the form of an elongated pin that is arranged parallel to the axis of the mount while the outer member is generally cylindrical in shape and slotted to define a plurality of columns that lie in a plane that is generally perpendicular to the axis of the mount. A moment force is accommodated by bending of both the pin and the columns in the outer member. Lateral forces are accommodated primarily by bending of the columns in the outer member.

BRIEF DESCRIPTION OF THE DRAWINGS

The invention will be more fully understood from the following detailed description thereof, taken in accordance with the accompanying drawings, which form a part of this application and in which.

DETAILED DESCRIPTION OF THE INVENTION

Figure 1:
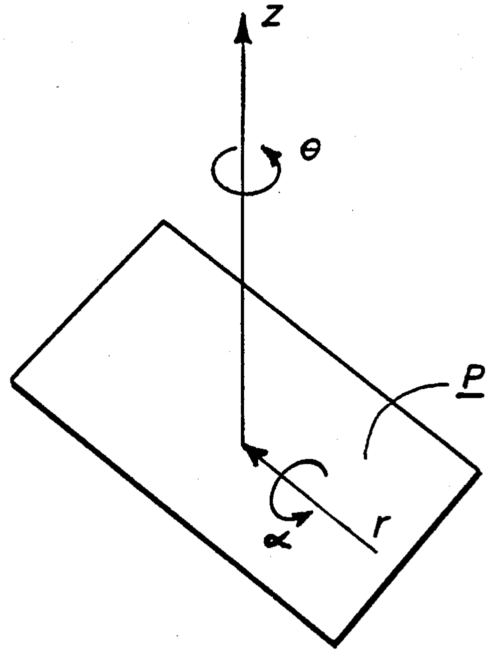
FIG. 1 is a definitional diagram showing the coordinate system to which the operation of the motor mount in accordance with the present invention will be referenced.

Throughout the following detailed description similar reference numerals refer to similar elements in all figures of the drawings.

A typical centrifuge system includes a drive motor mounted to the superstructure of the instrument a shaft extending from the drive motor into the chamber of the instrument, a rotor mounting device, also known as a "spud," disposed at the upper end of the shaft, and a rotor mounted to the spud. The system is acted upon by forces in the vertical direction z, lateral (or shear) direction r, the torsion direction $\theta$ and the moment (or pivot) direction $\alpha$, where these various directions are as indicated on the coordinate system shown in FIG. 1. The vertical forces act on the system along the z axis, the lateral forces act along any axis r lying in a plane P perpendicular to the z axis, the torsional forces $\theta$ act angularly about the z axis, and the moment forces o act angularly about any axis r.

For such a system the force equations can be written as follows:

$$F_z = m\ddot{z} + C_z\dot{z} + K_z z = O \quad (1)$$

$$F_r = m\ddot{r} + C_r\dot{r} + K_r r = O \quad (2)$$

$$F_\theta = m\ddot{\theta} + C_\theta\dot{\theta} + K_\theta\theta = O \quad (3)$$

$$\text{i } F_\alpha = m\ddot{\alpha} + C_\alpha\dot{\alpha} + K_\alpha\alpha = O \quad (4)$$

where the character "C" represents the damping coefficient in the respective subscripted direction whole the character "K" represents the stiffness coefficient in the respective subscripted direction.

Figure 2:
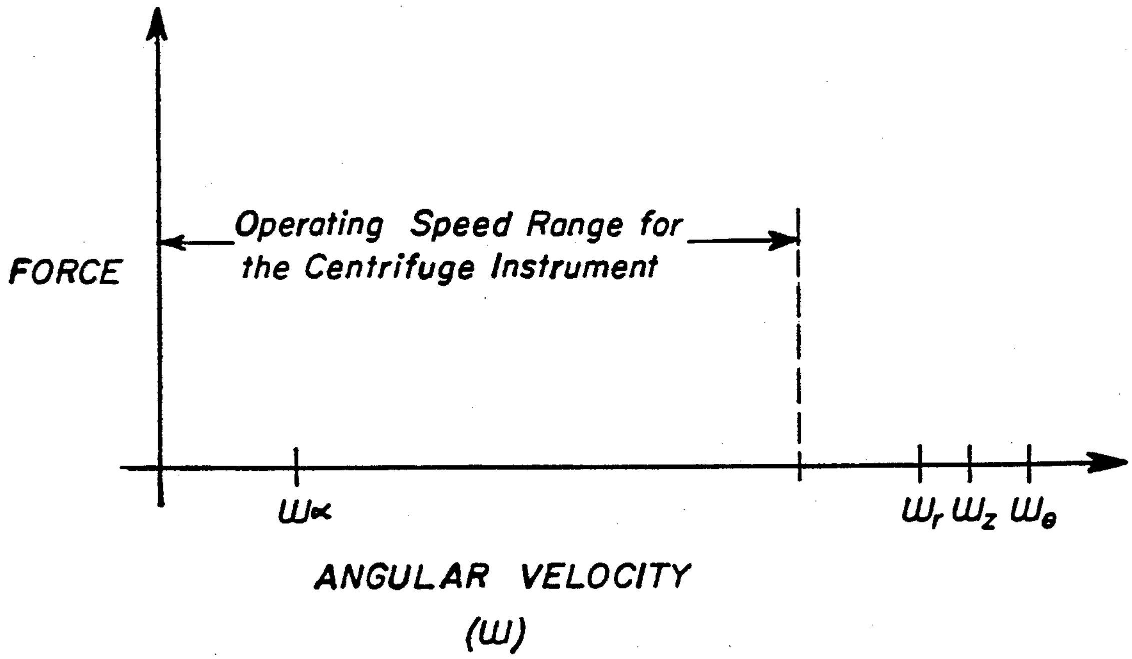
FIG. 2 is a graphical representation of the relationship between the operating speed of the instrument and the critical speeds controlled primarily by the various stiffness constants.

It would be desirable, as shown in FIG. 2, to structure the system in such a manner that the natural frequencies $\omega_z$, $\omega_r$, and $\omega_\theta$of the system due primarily to the respective stiffness coefficient (K) in the z, r and $\theta$ directions occur far from the normal operating speed range of the system, while the natural frequency $\omega_\alpha$of the system due primarily to the stiffness coefficient $K_\alpha$occurs relatively early in the range. In this manner destructive critical speeds would be far removed from the range of system operation or would occur so early in the operation that the energy level at which the natural frequency occurs is not sufficient to cause significant vibration of the instrument.

To accomplish this end the motor mount 10 in accordance with a first embodiment of the present invention is structured such that the vertical (z), lateral (r) and torsional $\theta$ forces are accommodated by compression or tension of columns, while the moment force ($\alpha$) is accommodated by column bending. In a motor mount 10' in accordance with an alternate embodiment of the present invention the vertical (z) and torsional ($\theta$) forces are accommodated by placing columns in compression or tension, lateral (r) force is accommodated by placing columns with a relatively high moment of inertia in bending and moment force ($\alpha$) is accommodated by placing columns with a relatively low moment of inertia in bending. In either embodiment the stiffness coefficient $K_\alpha$is relatively much less than the stiffness coefficient associated with the other directions.

Figure 3:
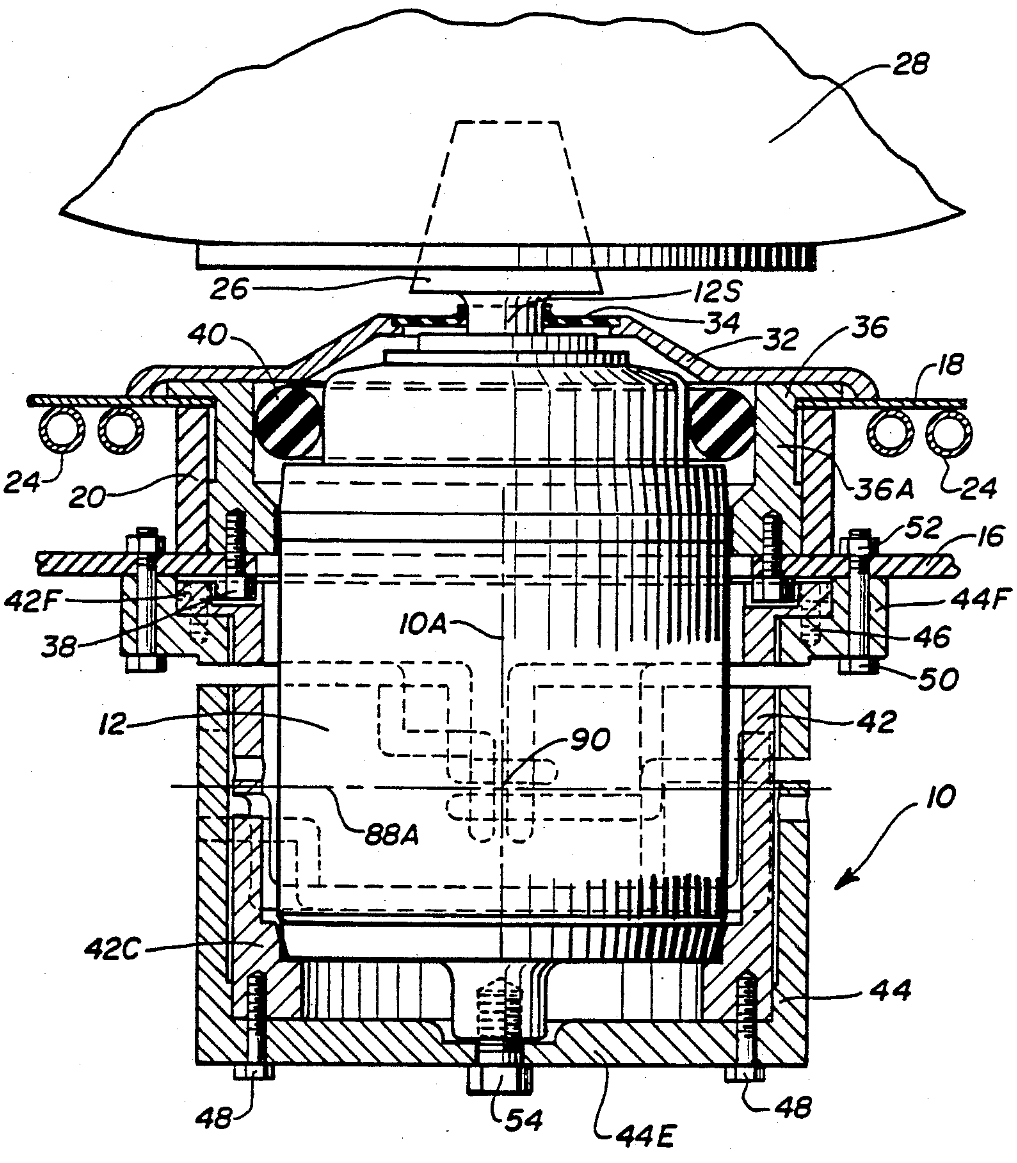
FIG. 3 is a side elevational view entirely in section of a motor mount in accordance with the present invention used in operational environment of supporting a drive motor centrifuge instrument.

Referring to FIG. 3 shown is a mount generally indicated by the reference character 10 for supporting a drive motor 12 in an operational position on the interior of a centrifuge instrument. The mount 10 has an axis 10A extending centrally therethrough which conveniently aligns along the z axis of the coordinate system of FIG. 1. The centrifuge instrument includes a structural plate 16 that forms part of the superstructure of the instrument housing. A bowl, or chamber 18 is supported above the plate 16 by a stand-off ring 20.

The bowl 18 may be refrigerated, as indicated by the coils 24 affixed to the undersurface of the bowl 18. The shaft 12S of the motor 12 projects into the interior of the bowl 18 and terminates in a mounting spud 26. The spud 26 is configured to accept a rotating element, or rotor, 28 in a manner appreciated by those with skill in the art.

The area about the upper end of the motor 12 is closed by a thermally insulating heat shield 32 that has a flexible elastomeric boot 34 thereon. The shield 32 is supported by a collar 36 having an enlarged abutment portion 36A which is secured to the plate 16 by screws 38. A gasket 40 surrounds the upper end bell of the motor 12 in sealing relationship with the abutment 36A. The gasket 40 may also impart damping to the system.

Referring to FIGS. 3 through 6 the motor mount 10 in accordance with a first embodiment of the invention itself comprises a first, inner and a second, outer, mounting member 42 and 44, respectively. Each of the members 42 and 44 is substantially cylindrical in shape. The outer member 44 has closed end, as shown at 44E, and a radially flaring flange 44F at the opposite end thereof. The inner member 42 is configured to exhibit an enlarged collar 42C at one end thereof and an outwardly flaring flange 42F at the opposite end. The members 42 and 44 are conveniently joined together by any suitable arrangement. In the FIGS. 4 through 6 the inner member 42 is connected to the outer member 44 by array of bolts 46 and 48. The bolts 46 pass in a generally axial direction relative to the member 42 through the flange 42F of the inner member 42 into the flange 44F of the outer member 44. The bolts 48 extend through the periphery of the closed end 44E of the outer member 44 into the collar 42C of the inner member 42. The mount 10 is itself secured to the instrument by bolts 50 that extend through the flange 44F of the outer member 44 and through the plate 16 where they are held by nuts 52. The motor 12 is attached to the mount 10 by a central bolt 54 that extends through the closed end 44E of the member 44 into the lower end bell of the motor 12. The situation could be reversed, if desired, and the motor attached to the outer member and the inner member received to the instrument.

Figure 4:
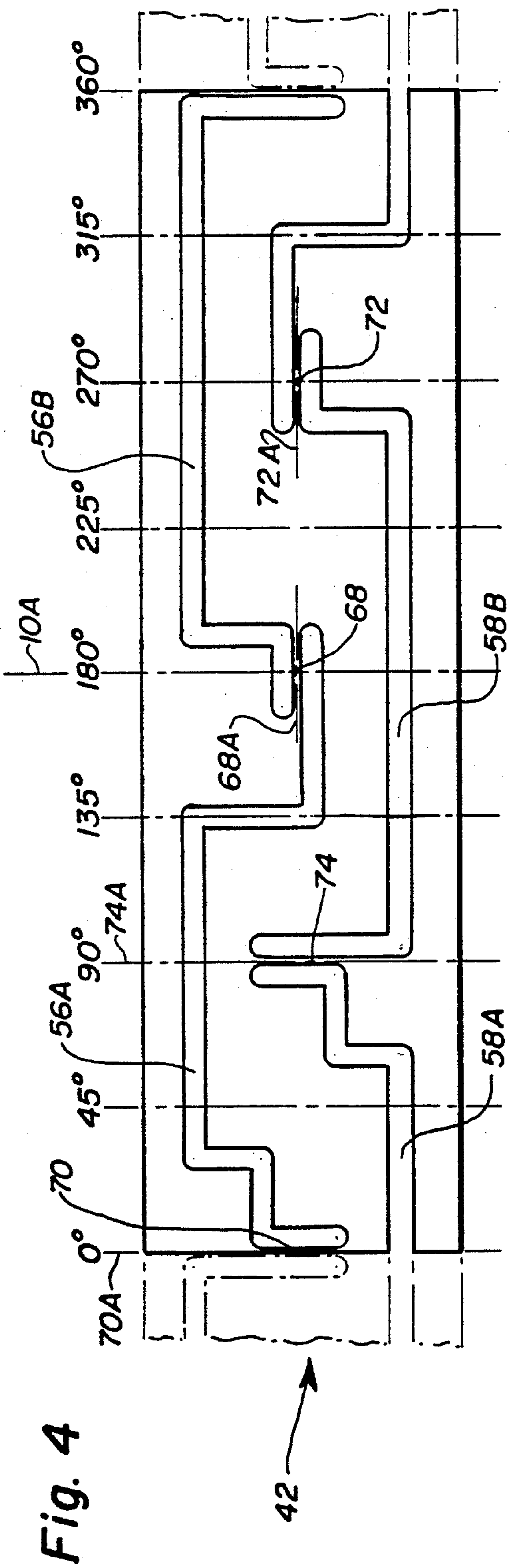
FIGS. 4 and 5 are, respectively, developed views of the mounting members used in the motor mount in accordance with the present invention.
Figure 5:
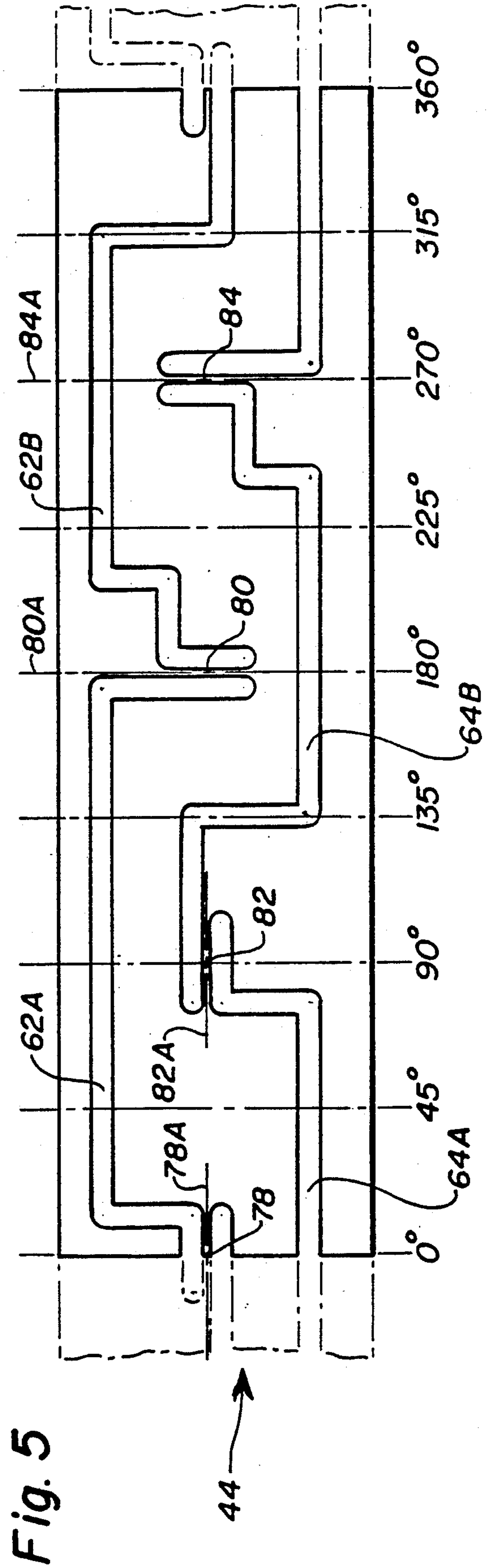

As is best seen in the developed views shown in FIGS. 4 and 5, both the inner mounting member 42 and the outer mounting member 44 are provided with cooperating pairs of upper and lower slots than extend through the walls of each member. In the case of the inner member 42 (FIG. 4) the upper pair of slots is indicated by the reference characters 56A and 56B. The lower pair of slots is indicated by the characters 58A and 58B. The outer member 44 (FIG. 5) is similarly configured. The upper pair of slots is indicated by the characters 62A and 62B while the lower pair of slots is indicated by the characters 64A and 64B.

Each pair of slots in each member is cooperable to define therein at least a first, horizontal, column and a second vertical, column, For example, as seen in FIG. 4, the upper pair of slots 56A and 56B cooperates to define a horizontal column 68 and a Vertical column 70 in the material of the member 42. Similarly, the lower pair of slots 58A, 58B is arranged to define a horizontal column 72 and a vertical column 74. The horizontal columns 68 and 72 are angularly spaced ninety degrees while the vertical columns 70 and 74 are also angularly spaced by the same amount as one proceeds about the periphery of the inner member 42. The vertical columns 70, 74 are each spaced ninety degrees from the respective adjacent horizontal column 72, 68, as seen in FIG. 4.

An analogous relationship holds in the case of the outer member 44. As is seen from FIG. 5 the upper pair of slots 62A and 62B cooperate to define a horizontal column 78 and a vertical column 80 in the material of the member 44. Similarly the lower pair of slots 64A and 64B is arranged to define a horizontal column 82 and a vertical column 84. The horizontal columns 78 and 82 are angularly spaced ninety degrees while the vertical columns 80 and 84 are also angularly spaced by this amount as one proceeds about the periphery of the outer member 44. As in the case of the member 42, the vertical columns 80, 84 are each spaced ninety degrees from the respective adjacent horizontal column 82, 78, as illustrated in FIG. 5.

As used throughout this application by "vertical" it is meant that the axis of the column is parallel to the axis of the mount while the term "horizontal" is meant to indicate that the axis of the column is perpendicular to the axis of the mount. Thus, the axis 68A, 72A, 78A and 82A of each of the horizontal columns 68, 72, 78, and 82, respectively, lies in a plane (i.e., the plane P) perpendicular to the axis 10A of the mount 10 The axis 70A, 74A, 80A and 84A of each of the respective vertical columns 70, 74, 80, and 84 is parallel to the axis 10A of the mount 10.

Figure 6:
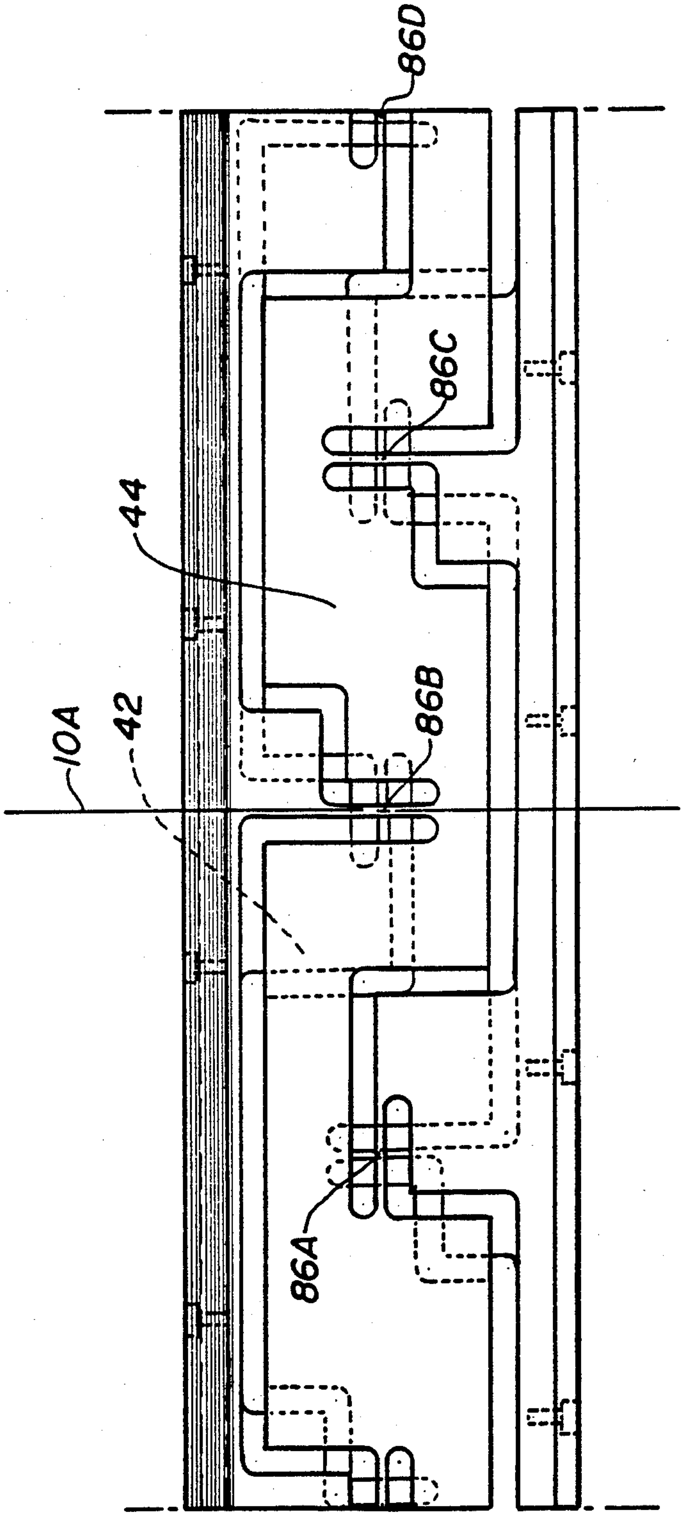
FIG. 6 is a developed view similar to FIGS. 4 and 5 illustrating the relationship of the mounting members with respect to each other.

As is seen from FIG. 6, when the members 42 and 44 are telescopically arranged one within the other the axis of each of the vertical columns in one member intersects with the axis of the corresponding radially adjacent horizontal column in the other member. These points of intersection are indicated by reference characters 86A, 86B, 86C, 86D. The intersection point 86 of the axes of the columns preferably occurs at their mid-point so that intersection points 86 lie in a common plane that is perpendicular to the axis 10A. When the mount is assembled with the members 42, 44 telescoped the vertical columns 70, 74 (on the member 42) and the vertical columns 80, 84 (on the member 44) should be symmetrically arranged (in a plane parallel to the plane P) about the axis 10A of the mount to avoid unnecessary bending moments on the vertical columns. Preferably the horizontal columns 68, 72, 78, and 82 should also be symmetrically disposed about the axis 10A. Lines 88A, 88B (FIG. 3) joining opposed intersection points 86A, 86C and 86B, 86D themselves intersect at a point 90 on the axis 10A. The point 90 is, as will be developed, the pivot point for the mount 10. Note that in FIG. 3 line 88B appears coincident with the point 90.

In operation, the first embodiment of the motor mount in accordance with the present invention makes use of the well-known fact that columns in either compression or tension are inherently stiffer than the same column would be in bending. In directions where it is desired to exhibit a relatively high stiffness coefficient the forces imposed on the mount in these directions are accommodated by placing predetermined ones of the columns in either tension or compression. In directions where a relatively lower stiffness coefficient is desired forces imposed on the mount in those directions are accommodated by the bending of the columns.

Thus, in the described assembled relationship of the motor mount 10 shown in FIGS. 3 through 6, forces in the vertical direction are accommodated primarily by the vertical columns 70, 74, 80, and 84 being placed in either tension or compression. Torsional ($\theta$) and lateral (r) forces are accommodated primarily by placing all of the horizontal columns 68, 72, 78, and 82 in either compression or tension. However, moment ($\alpha$) forces are accommodated by placing all of the columns in bending. It should be readily appreciated that alternate embodiments of the invention may be implemented wherein, for example, the vertical and horizontal columns on each of the members could be alternately disposed as contrasted to the situation shown in the drawings wherein the vertical and horizontal columns are adjacent. In addition an arrangement may be envisioned wherein all of the vertical columns are disposed on the outer member and all of the horizontal columns are disposed on the inner member (or vice versa) and still remain within the contemplation of the present invention. An example if such a system is disclosed in the remaining Figures of the present application.

Figure 7:
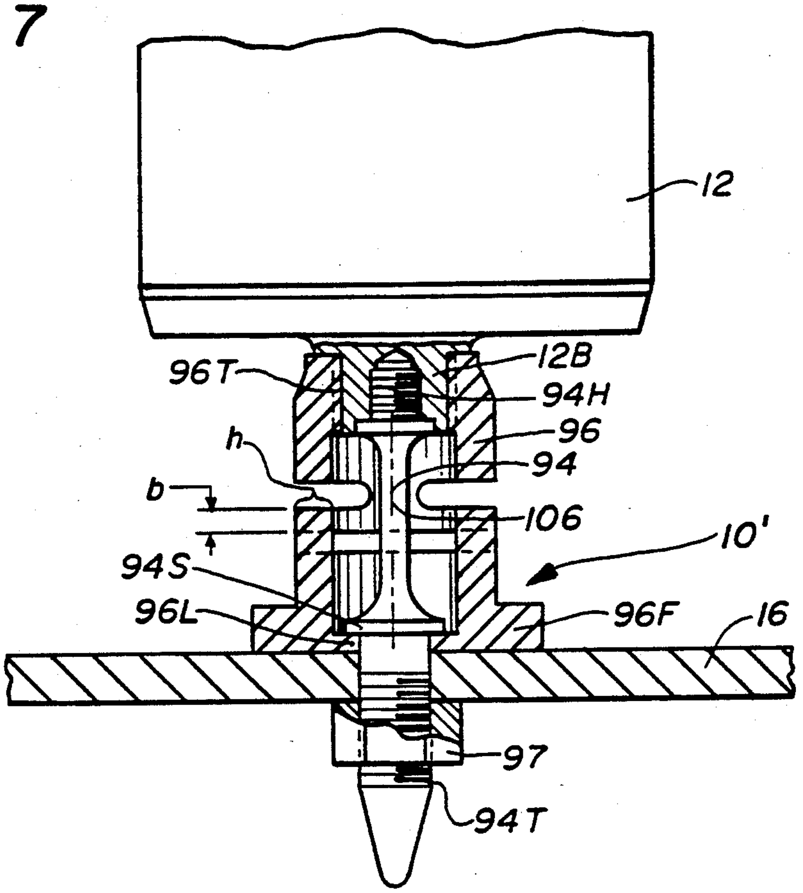
FIG. 7 is a side elevational view entirely in section of an alternate embodiment of the present invention.
Figure 8:
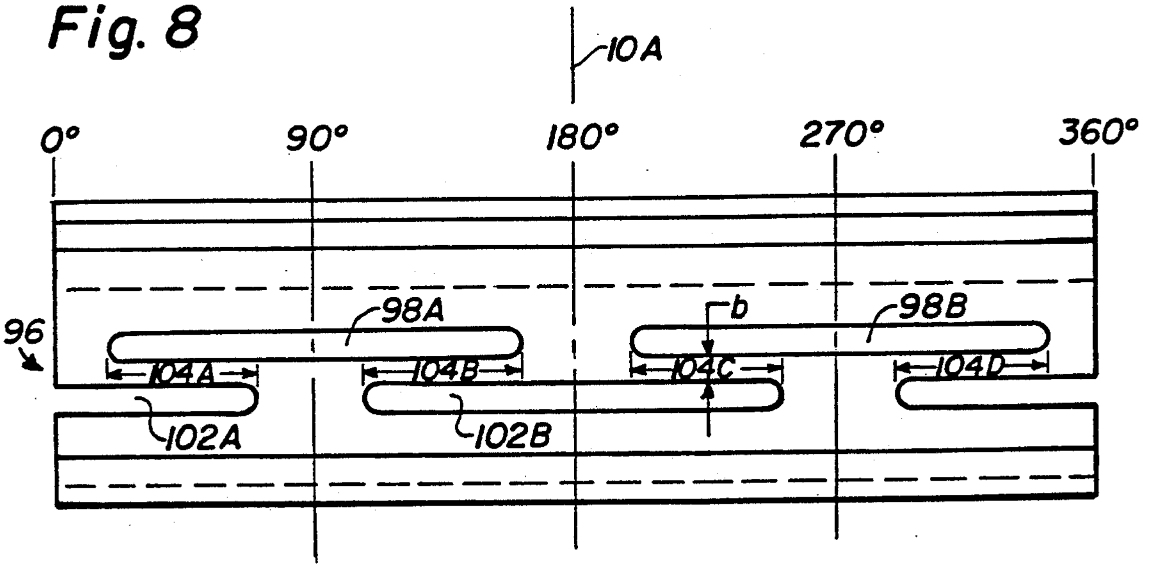
FIG. 8 is a developed view of the outer mounting member of the embodiment shown in FIG. 7.
Figure 9:
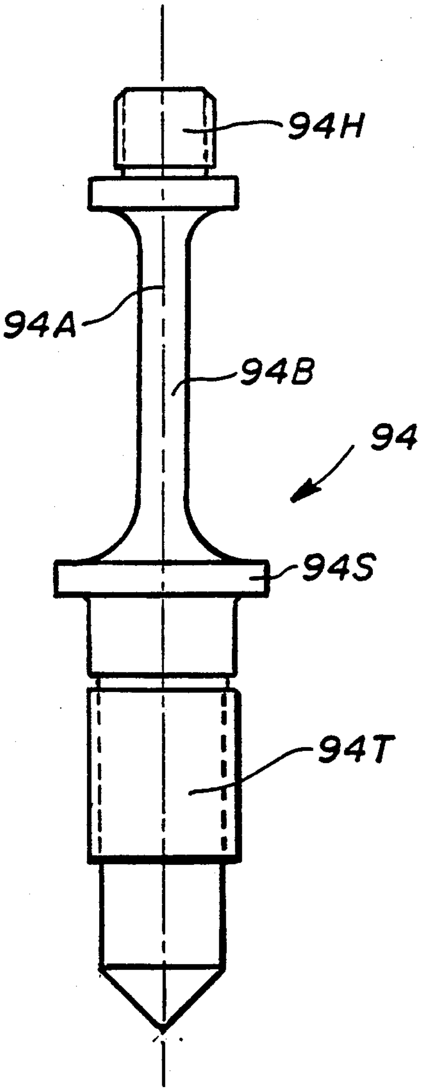
FIG. 9 is an elevational view of the inner mounting member of the invention shown in FIG. 7.

Referring now to FIGS. 7 through 9, an alternate embodiment of the motor mount 10′ is shown. The mount 10′ includes a first, central, member 94 and a second outer, member 96. The central member 94 is an elongated, pin-like member having an integral head portion 94H, a body portion 94B, a shoulder 94S and a tail portion 94T. Both the head 94H and the tail 94T are threaded. The head 94H is threadedly secured to a boss 12B located on the lower end bell of the motor 12. The exterior of the boss 12B is also threaded. The tail 94T is secured to the support plate 16 which in this instance is disposed below the motor 12 of the centrifuge. A nut 97 engages the protruded threaded portion of the tail 94T. The body 94B exhibits a generally circular cross section and defines the main structural portion of the inner member 94. The member 94 has an axis 94A therethrough that aligns with the axis 10A of the mount (and with the z axis).

The outer member 96 is a hollow and generally cylindrical in shape. A flange 96F flares outwardly from one end of the member 96 and a lip 96L extends inwardly of the member 96 at the same end thereof. The interior surface at the opposite end of the member 96 is provided with threads 96T which engage the threads on the exterior of the boss 12B. The shoulder 96S of the inner member 94 clamps against the lip 96L of the outer member 96 to secure the same against the plate 16′.

As can best be seen in the developed view shown in FIG. 8 the outer member 96 is provided with cooperating pairs of upper and lower slots that extend through the walls of the member. The upper pair of slots is indicated by reference characters 98A and 98B and the lower pair of slots is indicated by the characters 102A and 102B. The upper and lower slots cooperate to define horizontal (as defined above), semicircular columns 104A, 104B, 104C, and 104D therebetween. The columns 104 are equiangularly spaced with the axes of the columns lying in a plane perpendicular to the axis 10A of the mount 10'. Each of the columns 104 is generally rectangular in cross section and has a width dimension b (measured along the axis of the member 96) and a depth dimension h (measured radially of the member 96). The width dimension b is relatively small when compared to the depth dimension h.

The axes of the semicircular columns lie on a common plane perpendicular to the axis of the mount. This plane intersects the axis 94A of the member 94 at the midpoint of the body portion 94B to define a pivot point 106 about which the mount 10' pivots.

In operation the second embodiment of the motor mount 10' in accordance with the present invention makes use of the well-known facts that a column in either compression or tension is inherently stiffer than the same column would be if loaded in bending and that a column with a rectangular cross section loaded in bending is stiffer when the load is imposed along its narrow dimension b as opposed to loading along the wider dimension h.

Thus, in directions where it is desired to exhibit a relatively high stiffness coefficient the forces imposed on the mount in these directions are accommodated either by placing predetermined the column or columns in either tension or compression or by positioning the columns such that loading is accommodated on the narrow, higher moment of inertia face b. In directions where a relatively lower stiffness coefficient is desired forces imposed on the mount in those directions are accommodated by the bending of the columns about the wider lower moment of inertia face h.

In accordance with this embodiment of the 7 through 9, the vertical column defined by the body portion 94B of the inner member 94 accommodates forces in the vertical (z) direction by being placed in either tension or compression. Torsional ($\theta$) forces are accommodated by placing all of the horizontal columns 104A through 104D in the outer member 96 in compression. Lateral (r) forces are imposed upon the columns 104A through 104D along the narrow faces b thereof. However moment ($\alpha$) forces are imposed on the columns along the relatively wider face h.

It should be appreciated from the foregoing that, in function, either embodiment of the present invention will accommodate any moment by pivoting about the pivot point 90, 106 (as the case may be) and as such will act as the kinematic equivalent of a ball joint. Although the above-described embodiments of the invention are set forth in the context of a mount of a motor for a centrifuge instrument it should be understood that the mounting apparatus in accordance with the present invention may be used in any other environment.

Those skilled in the art, having the benefit of the teachings of the present invention, may effect numerous modifications thereto. These modifications are to be construed as lying within the scope of the present invention, as defined by the appended claims.

What is claimed is:

1. A mounting apparatus having an axis therethrough, the mounting apparatus comprising:

a first and second mounting member, each mounting member being generally cylindrical in shape, the mounting members each being provided with an array of slots which cooperate to form in each member a first plurality of columns the axes of which are parallel to the axis of the mounting member and a second plurality of columns the axes of which extend perpendicular to the axis of the mounting member, the columns in one member that are parallel to the axis intersecting the columns in the other member that extend perpendicular to the axis, the columns being arranged such that a moment force imposed on the mount is accommodated by bending of at least some of the columns while vertical, lateral and torsional forces imposed on the mounting member are accommodated by compression or tension in at least some of the columns.

* * * * *